United States Patent Office 2,945,878
Patented July 19, 1960

2,945,878
VINYL N,N-DIBUTYL ADIPAMATE

John L. Ohlson, Bedford, and Elmar K. Wilip, Cambridge, Mass., assignors to W. R. Grace & Co., Cambridge, Mass., a corporation of Connecticut No Drawing. Filed Sept. 15, 1959, Ser. No. 839,991

1 Claim. (Cl. 260—482)

This invention is directed to vinyl N,N-dibutyl adipamate having the structure $$(C_4H_9)_2NCO(CH_2)_4COOCH=CH_2$$

This new compound is a liquid having a boiling point of 195–200° C. (1 mm). It has been found to be useful in the production of valuable polymers and copolymers.

The compound of this invention is conveniently made by the so-called "vinyl interchange" reaction, in which vinyl esters may be prepared by reacting vinyl acetate with the desired carboxylic acid in the presence of a catalyst, usually a mercuric salt.

In the preferred method of preparing the new compound of this invention, N,N-dibutyl adipamic acid, $$(C_4H_9)_2NCO(CH_2)_4COOH$$

is reacted with a large excess of vinyl acetate in the presence of mercuric sulfate. The reaction is allowed to proceed at room temperature and at normal atmospheric pressure until equilibrium is reached. About 74% of the acid is converted to its vinyl ester.

The following example depicts a representative preparation of the new compound of this invention.

Example I

To 1032 g. (about 12 moles) of vinyl acetate there were added 0.1 g. copper resinate (polymerization inhibitor) and 1.2 g. mercuric acetate, and the mixture was cooled to 0° C. An amount of concentrated sulfuric acid (0.3 ml.) approximately equivalent to the mercuric acetate was slowly stirred into the mixture, followed by the addition of 257 g. (about 1 mole) of N,N-dibutyl adipamic acid. The mixture was allowed to stand for about 5 days at room temperature. When a sample was analyzed for vinyl N,N-dibutyl adipamate and N,N-dibutyl adipamic acid, 74% of the acid was found to have been converted to vinyl N,N-dibutyl adipamate. The sulfuric acid was then neutralized with 2.5 g. of sodium acetate trihydrate dissolved in 5 ml. of water, and the excess of vinyl acetate together with the acetic acid formed during the reaction were removed by flash distillation. Unreacted acid remaining in the reaction mixture was neutralized by washing with a 0.1 N sodium hydroxide solution until the wash remained alkaline. The vinyl N,N-dibutyl adipamate was extracted with ether and was further purified by high vacuum distillation.

The vinyl N,N-dibutyl adipamate prepared as shown in Example I was copolymerized with vinyl acetate and vinyl laurate as described in the following example.

Example II

To a mixture of 86 grams of vinyl acetate and 226 grams of vinyl laurate there was added 15.5 grams of vinyl N,N-dibutyl adipamate. The monomer mixture was dissolved in 400 grams of benzene, and 2.4 grams of benzoyl peroxide was added as a catalyst. Polymerization was effected by heating the solution to a temperature of between 70° C. and 80° C. and maintaining it at this temperature for seven hours, after which the polymer was precipitated by the addition of methanol, separated from the solvent and dried.

The polymer prepared by the process of Example II was a very viscous, tacky, water-white liquid. Because of its highly adhesive nature it has been found to be useful in the manufacture of pressure sensitive adhesives. It may also be used as a plasticizer, softener or tackifying agent for other polymeric materials.

The new compound of our invention may be polymerized alone or may be copolymerized with many different vinyl monomers, and is particularly useful whenever it is desired to incorporate an amino nitrogen into a polymeric material.

This application is a continuation-in-part of copending application Serial No. 783,708 filed December 30, 1958, now abandoned.

We claim:

Vinyl N,N-dibutyl adipamate.

References Cited in the file of this patent

UNITED STATES PATENTS 2,627,487    Drake et al. _____ Feb. 3, 1953

OTHER REFERENCES

Campbell: Ind. Eng. Chem., 47, pages 1213 to 1216 (1955).